(12) United States Patent
Adams et al.

(10) Patent No.: US 7,735,123 B2
(45) Date of Patent: Jun. 8, 2010

(54) SYSTEM AND METHOD FOR ASSOCIATING MESSAGE ADDRESSES WITH CERTIFICATES

(75) Inventors: Neil P. Adams, Waterloo (CA); Michael S. Brown, Waterloo (CA); Herbert A. Little, Waterloo (CA)

(73) Assignee: Research In Motion Limited, Waterloo, Ontario (CA)

( * ) Notice: Subject to any disclaimer, the term of this patent is extended or adjusted under 35 U.S.C. 154(b) by 1192 days.

(21) Appl. No.: 11/280,235

(22) Filed: Nov. 17, 2005

(65) Prior Publication Data

US 2006/0294368 A1 Dec. 28, 2006

Related U.S. Application Data

(60) Provisional application No. 60/693,413, filed on Jun. 24, 2005.

(51) Int. Cl.
*H04L 29/00* (2006.01)
(52) U.S. Cl. ............................ 726/6; 713/156; 713/176; 726/10
(58) Field of Classification Search ........................ None
See application file for complete search history.

(56) References Cited

U.S. PATENT DOCUMENTS

| | | | |
|---|---|---|---|
| 5,737,419 A | | 4/1998 | Ganesan |
| 6,108,788 A | | 8/2000 | Moses et al. |
| 7,392,541 B2 * | | 6/2008 | Largman et al. ............... 726/17 |
| 7,480,664 B2 * | | 1/2009 | Dunn et al. .................. 707/100 |
| 2002/0023220 A1 | | 2/2002 | Kaplan |
| 2005/0038756 A1 | | 2/2005 | Nagel |

FOREIGN PATENT DOCUMENTS

WO    WO 2005/015867    2/2005

OTHER PUBLICATIONS

"Chamber SimplySign—Online Help: Using MS Outlook Express 5 Secure Email", Sep. 2004, Retrieved from the Internet on Aug. 16, 2009: <URL: http://web.archive.org/web/20040902122931/http://www.simplysign.co.uk/support/using_outlookexpress5_secure_email.html>.*

"Using S/MIME in Microsoft Outlook", Apr. 2004, Retrieved from the Internet on Aug. 16, 2009: <URL: http://web.archive.org/web/20040421104314/http://www.dartmouth.edu/~deploypki/materials/modules/using/smime/outlook.doc>.*

(Continued)

*Primary Examiner*—Minh Dinh
(74) *Attorney, Agent, or Firm*—Bereskin & Parr LLP/S.E.N.C.R.L., s.r.l.

(57) ABSTRACT

A system and method for associating message addresses with certificates, in which one or more secondary message addresses are identified and associated with a user-selected certificate. The secondary message addresses are saved in a data structure that resides in a secure data store on a computing device, such as a mobile device. When a message is to be encrypted and sent to an individual using a particular certificate, an address mismatch would not be detected so long as the address to which the message is to be sent matches any of the message addresses associated with the certificate. The message addresses associated with the certificate include any message addresses contained within the certificate itself ("primary message addresses") as well as any secondary message addresses that have been subsequently associated with the certificate.

21 Claims, 9 Drawing Sheets

OTHER PUBLICATIONS

PCT International Search Report and The Written Opinion of the International Searching Authority. Application No. PCT/CA2005/001743 Date: Mar. 28, 2006.

European Examination Report. Application No. 05807962.5. Dated: Apr. 9, 2008.

European Supplemental Search Report, Application No. 05807962.5. Dated: May 7, 2007.

Lioy, Antonio et al., "The EuroPKI Experience", Public Key Infrastructure. First European PKI Workshop: Research and Applications, EuroPKI 2004. Proceedings. (Springer-Verlag, Lecture Notes in Computer Science), vol. 3093, Jun. 26, 2004, pp. 14-27.

Electronic Warfare Associates-Canada Ltd. "CanCERT PKI—Certificate Installation Procedures Document No. 9997-249-D200" http://cancert.ca/certsearch/Certificate_Installation_Procedures.pdf (Jan. 9, 2003).

European Communication under Rule 71(3) EPC. Application No. 05807962.5. Dated: Nov. 10, 2008.

Chinese First Office Action. Application No. 200580008415.2. Dated: Mar. 20, 2009.

Indian First Examination Report. Application No. 4480/DELNP/2006. Dated: Aug. 4, 2009.

\* cited by examiner

ASSOCIATED ADDRESSES
ADDRESSES IN CERTIFICATE:
johndoe@companyabc.com
OTHER ADDRESSES:
johndoe@companyabc.net

FIG. 8

SYSTEM AND METHOD FOR ASSOCIATING MESSAGE ADDRESSES WITH CERTIFICATES

CROSS-REFERENCE TO RELATED APPLICATIONS

This application claims the benefit of U.S. Provisional Application No. 60/693,413, filed Jun. 24, 2005, the contents of which are herein incorporated by reference.

FIELD OF THE INVENTION

Embodiments of the invention relate generally to the processing of messages, such as e-mail messages, and more specifically to systems and methods for associating message addresses with certificates that may be used in the processing of encoded messages.

BACKGROUND OF THE INVENTION

Electronic mail ("e-mail") messages may be encoded using one of a number of known protocols. Some of these protocols, such as Secure Multiple Internet Mail Extensions ("S/MIME") for example, rely on public and private encryption keys to provide confidentiality and integrity, and on a Public Key Infrastructure (PKI) to communicate information that provides authentication and authorization. Data encoded using a private key of a private key/public key pair can only be decoded using the corresponding public key of the pair, and data encoded using a public key of a private key/public key pair can only be decoded using the corresponding private key of the pair. The authenticity of public keys used in the encoding of messages may be validated using certificates. In particular, if a user of a computing device wishes to encrypt a message before the message is sent to a particular individual, the user will require a certificate for that individual. That certificate will typically comprise the public key of the individual, as well as other identification-related information. Similarly, if a user of a computing device receives a message that has been digitally signed by a particular individual, the user will require the proper certificate (comprising a public key) for that individual if the user wishes to verify the digital signature in the message.

Typically, in known e-mail applications, if an attempt is made to employ a particular certificate to, for example, encrypt a message that the user intends to send to an individual, and that certificate contains an e-mail address, but the e-mail address contained in that certificate does not match the e-mail address to which the message is to be sent, an error message indicating an address mismatch would normally be returned to the user. As a result of the address mismatch, the message would be neither encrypted nor sent.

BRIEF DESCRIPTION OF THE DRAWINGS

For a better understanding of embodiments of the systems and methods described herein, and to show more clearly how they may be carried into effect, reference will now be made, by way of example, to the accompanying drawings in which:

FIG. 8 is an example dialog box illustrating a list of message addresses associated with a certificate.

DETAILED DESCRIPTION

Figure 1:
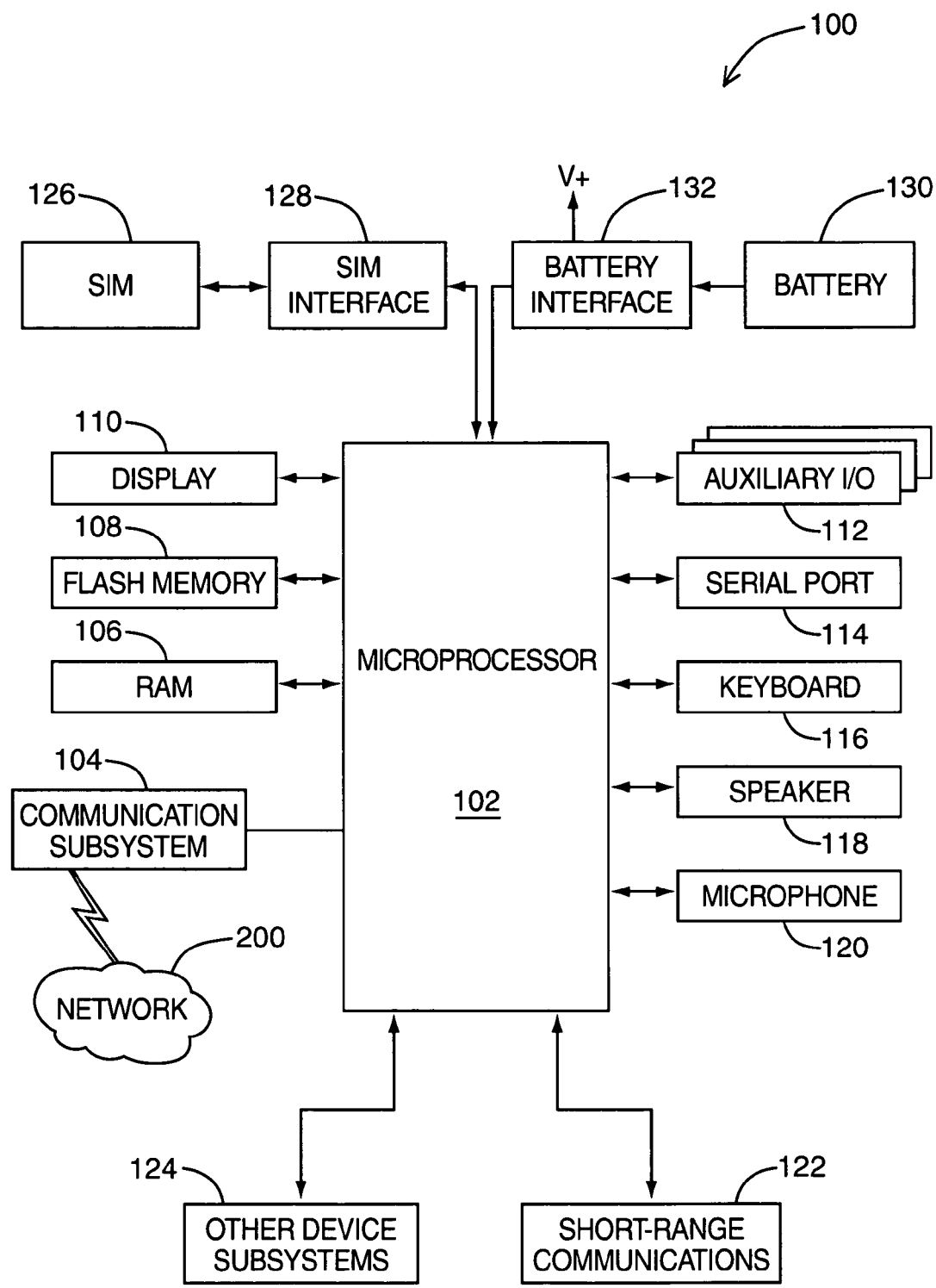
FIG. 1 is a block diagram of a mobile device in one example implementation.

With reference to the foregoing example, in the case where a message is to be encrypted and sent to an individual, in certain situations, it may be desirable to permit the message to be encrypted using a certificate that does not contain an e-mail address that matches the e-mail address of the individual to which the message is to be sent.

Embodiments of systems and methods are described herein where message addresses (e.g. e-mail addresses) are associated with certificates. More specifically, these embodiments may be employed to facilitate the association of one or more secondary message addresses with each of one or more certificates selected by the user of a computing device (e.g. a mobile device).

Accordingly, in the example where a message is to be encrypted using a particular certificate and sent to an individual, an address mismatch would not be detected so long as the message address to which the message is to be sent matches any of the message addresses associated with the certificate. The message addresses that are considered to be associated with the certificate include any message addresses contained within the certificate itself as well as any secondary message addresses that have been associated with the certificate.

In one broad aspect, there is provided a method of associating message addresses with certificates identified by a user of a computing device, wherein the method comprising the steps of: receiving first input data identifying a user-selected certificate, from the user of the computing device, wherein the user-selected certificate contains zero or more primary message addresses associated therewith; receiving second input data identifying one or more secondary message addresses to be associated with the user-selected certificate; and associating the one or more secondary message addresses with the user-selected certificate, by saving the one or more secondary message addresses in a data structure such that the user-selected certificate with which the one or more secondary message addresses are associated is identifiable; wherein the data structure resides in a secure data store on the computing device.

In another broad aspect, the secondary message addresses are stored with the user-selected certificate in the same data structure, in the secure data store on the computing device.

In another broad aspect, the secure data store on the computing device is password-protected.

In another broad aspect, the computing device is a mobile device.

Some embodiments of the systems and methods described herein make reference to a mobile device. A mobile device is a two-way communication device with advanced data communication capabilities having the capability to communicate with other computer systems. A mobile device may also include the capability for voice communications. Depending on the functionality provided by a mobile device, it may be referred to as a data messaging device, a two-way pager, a cellular telephone with data messaging capabilities, a wireless Internet appliance, or a data communication device (with or without telephony capabilities). A mobile device communicates with other devices through a network of transceiver stations.

Figure 2:
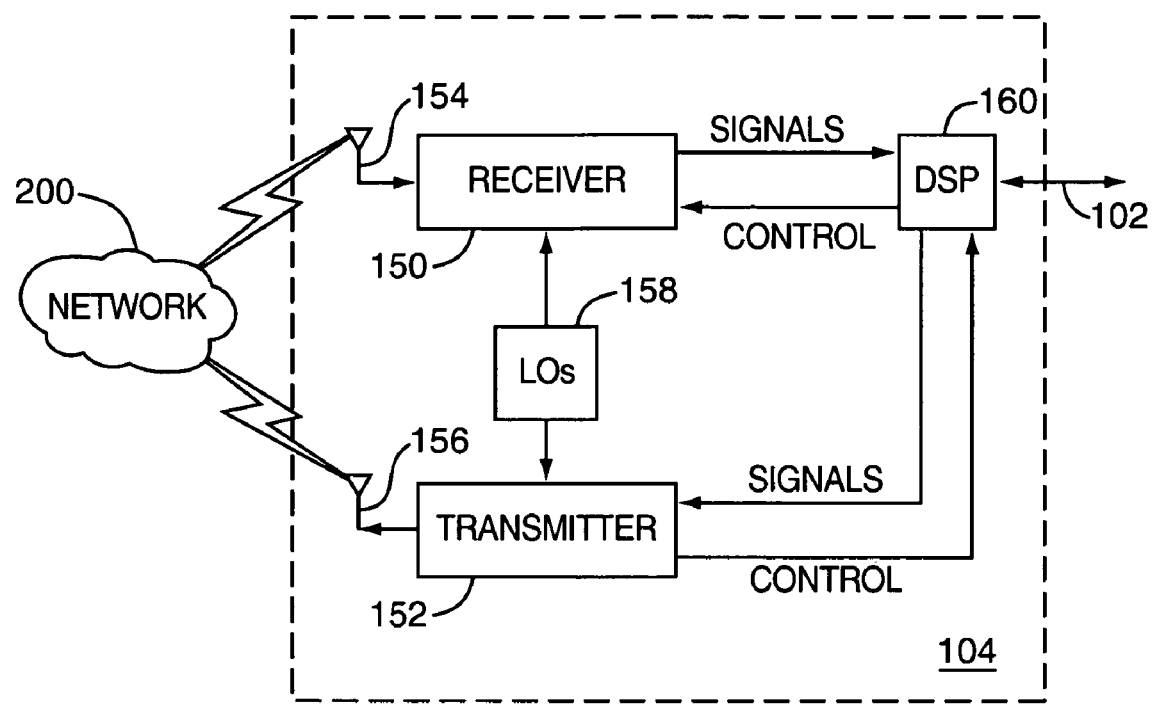
FIG. 2 is a block diagram of a communication subsystem component of the mobile device of FIG. 1.
Figure 3:
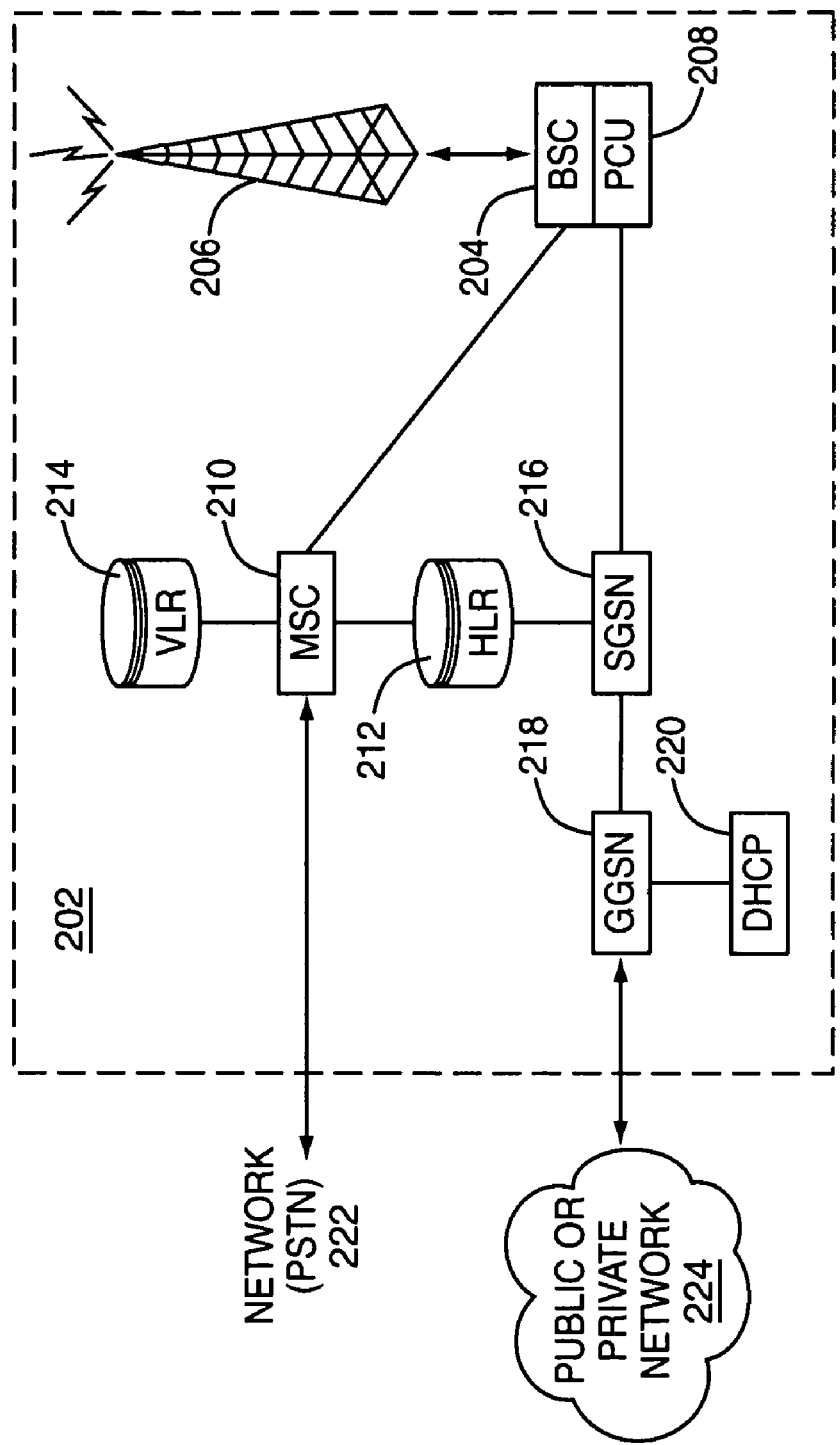
FIG. 3 is a block diagram of a node of a wireless network.

To aid the reader in understanding the structure of a mobile device and how it communicates with other devices, reference is made to FIGS. 1 through 3.

Referring first to FIG. 1, a block diagram of a mobile device in one example implementation is shown generally as 100. Mobile device 100 comprises a number of components, the controlling component being microprocessor 102. Microprocessor 102 controls the overall operation of mobile device 100. Communication functions, including data and voice communications, are performed through communication subsystem 104. Communication subsystem 104 receives messages from and sends messages to a wireless network 200. In this example implementation of mobile device 100, communication subsystem 104 is configured in accordance with the Global System for Mobile Communication (GSM) and General Packet Radio Services (GPRS) standards. The GSM/GPRS wireless network is used worldwide and it is expected that these standards will be superseded eventually by Enhanced Data GSM Environment (EDGE) and Universal Mobile Telecommunications Service (UMTS). New standards are still being defined, but it is believed that they will have similarities to the network behaviour described herein, and it will also be understood by persons skilled in the art that the invention is intended to use any other suitable standards that are developed in the future. The wireless link connecting communication subsystem 104 with network 200 represents one or more different Radio Frequency (RF) channels, operating according to defined protocols specified for GSM/GPRS communications. With newer network protocols, these channels are capable of supporting both circuit switched voice communications and packet switched data communications.

Although the wireless network associated with mobile device 100 is a GSM/GPRS wireless network in one example implementation of mobile device 100, other wireless networks may also be associated with mobile device 100 in variant implementations. Different types of wireless networks that may be employed include, for example, data-centric wireless networks, voice-centric wireless networks, and dual-mode networks that can support both voice and data communications over the same physical base stations. Combined dual-mode networks include, but are not limited to, Code Division Multiple Access (CDMA) or CDMA2000 networks, GSM/GPRS networks (as mentioned above), and future third-generation (3G) networks like EDGE and UMTS. Some older examples of data-centric networks include the Mobitex™ Radio Network and the DataTAC™ Radio Network. Examples of older voice-centric data networks include Personal Communication Systems (PCS) networks like GSM and Time Division Multiple Access (TDMA) systems.

Microprocessor 102 also interacts with additional subsystems such as a Random Access Memory (RAM) 106, flash memory 108, display 110, auxiliary input/output (I/O) subsystem 112, serial port 114, keyboard 116, speaker 118, microphone 120, short-range communications 122 and other devices 124.

Some of the subsystems of mobile device 100 perform communication-related functions, whereas other subsystems may provide "resident" or on-device functions. By way of example, display 110 and keyboard 116 may be used for both communication-related functions, such as entering a text message for transmission over network 200, and device-resident functions such as a calculator or task list. Operating system software used by microprocessor 102 is typically stored in a persistent store such as flash memory 108, which may alternatively be a read-only memory (ROM) or similar storage element (not shown). Those skilled in the art will appreciate that the operating system, specific device applications, or parts thereof, may be temporarily loaded into a volatile store such as RAM 106.

Mobile device 100 may send and receive communication signals over network 200 after required network registration or activation procedures have been completed. Network access is associated with a subscriber or user of a mobile device 100. To identify a subscriber, mobile device 100 requires a Subscriber Identity Module or "SIM" card 126 to be inserted in a SIM interface 128 in order to communicate with a network. SIM 126 is one type of a conventional "smart card" used to identify a subscriber of mobile device 100 and to personalize the mobile device 100, among other things. Without SIM 126, mobile device 100 is not fully operational for communication with network 200. By inserting SIM 126 into SIM interface 128, a subscriber can access all subscribed services. Services could include: web browsing and messaging such as e-mail, voice mail, Short Message Service (SMS), and Multimedia Messaging Services (MMS). More advanced services may include: point of sale, field service and sales force automation. SIM 126 includes a processor and memory for storing information. Once SIM 126 is inserted in SIM interface 128, it is coupled to microprocessor 102. In order to identify the subscriber, SIM 126 contains some user parameters such as an International Mobile Subscriber Identity (IMSI). An advantage of using SIM 126 is that a subscriber is not necessarily bound by any single physical mobile device. SIM 126 may store additional subscriber information for a mobile device as well, including datebook (or calendar) information and recent call information.

Mobile device 100 is a battery-powered device and includes a battery interface 132 for receiving one or more rechargeable batteries 130. Battery interface 132 is coupled to a regulator (not shown), which assists battery 130 in providing power V+ to mobile device 100. Although current technology makes use of a battery, future technologies such as micro fuel cells may provide the power to mobile device 100.

Microprocessor 102, in addition to its operating system functions, enables execution of software applications on mobile device 100. A set of applications that control basic device operations, including data and voice communication applications, will normally be installed on mobile device 100 during its manufacture. Another application that may be loaded onto mobile device 100 would be a personal information manager (PIM). A PIM has functionality to organize and manage data items of interest to a subscriber, such as, but not limited to, e-mail, calendar events, voice mails, appointments, and task items. A PIM application has the ability to send and receive data items via wireless network 200. PIM data items may be seamlessly integrated, synchronized, and updated via wireless network 200 with the mobile device subscriber's corresponding data items stored and/or associated with a host computer system. This functionality creates a mirrored host computer on mobile device 100 with respect to such items. This can be particularly advantageous where the host computer system is the mobile device subscriber's office computer system.

Additional applications may also be loaded onto mobile device 100 through network 200, auxiliary I/O subsystem 112, serial port 114, short-range communications subsystem 122, or any other suitable subsystem 124. This flexibility in application installation increases the functionality of mobile device 100 and may provide enhanced on-device functions, communication-related functions, or both. For example, secure communication applications may enable electronic commerce functions and other such financial transactions to be performed using mobile device 100.

Serial port 114 enables a subscriber to set preferences through an external device or software application and extends the capabilities of mobile device 100 by providing for information or software downloads to mobile device 100 other than through a wireless communication network. The alternate download path may, for example, be used to load an encryption key onto mobile device 100 through a direct and thus reliable and trusted connection to provide secure device communication.

Short-range communications subsystem 122 provides for communication between mobile device 100 and different systems or devices, without the use of network 200. For example, subsystem 122 may include an infrared device and associated circuits and components for short-range communication. Examples of short range communication would include standards developed by the Infrared Data Association (IrDA), Bluetooth, and the 802.11 family of standards developed by IEEE.

In use, a received signal such as a text message, an e-mail message, or web page download will be processed by communication subsystem 104 and input to microprocessor 102. Microprocessor 102 will then process the received signal for output to display 110 or alternatively to auxiliary I/O subsystem 112. A subscriber may also compose data items, such as e-mail messages, for example, using keyboard 116 in conjunction with display 110 and possibly auxiliary I/O subsystem 112. Auxiliary subsystem 112 may include devices such as: a touch screen, mouse, track ball, infrared fingerprint detector, or a roller wheel with dynamic button pressing capability. Keyboard 116 is an alphanumeric keyboard and/or telephone-type keypad. A composed item may be transmitted over network 200 through communication subsystem 104.

For voice communications, the overall operation of mobile device 100 is substantially similar, except that the received signals would be output to speaker 118, and signals for transmission would be generated by microphone 120. Alternative voice or audio I/O subsystems, such as a voice message recording subsystem, may also be implemented on mobile device 100. Although voice or audio signal output is accomplished primarily through speaker 118, display 110 may also be used to provide additional information such as the identity of a calling party, duration of a voice call, or other voice call related information.

Referring now to FIG. 2, a block diagram of the communication subsystem component 104 of FIG. 1 is shown. Communication subsystem 104 comprises a receiver 150, a transmitter 152, one or more embedded or internal antenna elements 154, 156, Local Oscillators (LOs) 158, and a processing module such as a Digital Signal Processor (DSP) 160.

The particular design of communication subsystem 104 is dependent upon the network 200 in which mobile device 100 is intended to operate, thus it should be understood that the design illustrated in FIG. 2 serves only as one example. Signals received by antenna 154 through network 200 are input to receiver 150, which may perform such common receiver functions as signal amplification, frequency down conversion, filtering, channel selection, and analog-to-digital (A/D) conversion. A/D conversion of a received signal allows more complex communication functions such as demodulation and decoding to be performed in DSP 160. In a similar manner, signals to be transmitted are processed, including modulation and encoding, by DSP 160. These DSP-processed signals are input to transmitter 152 for digital-to-analog (D/A) conversion, frequency up conversion, filtering, amplification and transmission over network 200 via antenna 156. DSP 160 not only processes communication signals, but also provides for receiver and transmitter control. For example, the gains applied to communication signals in receiver 150 and transmitter 152 may be adaptively controlled through automatic gain control algorithms implemented in DSP 160.

The wireless link between mobile device 100 and a network 200 may contain one or more different channels, typically different RF channels, and associated protocols used between mobile device 100 and network 200. A RF channel is a limited resource that must be conserved, typically due to limits in overall bandwidth and limited battery power of mobile device 100.

When mobile device 100 is fully operational, transmitter 152 is typically keyed or turned on only when it is sending to network 200 and is otherwise turned off to conserve resources. Similarly, receiver 150 is periodically turned off to conserve power until it is needed to receive signals or information (if at all) during designated time periods.

Referring now to FIG. 3, a block diagram of a node of a wireless network is shown as 202. In practice, network 200 comprises one or more nodes 202. Mobile device 100 communicates with a node 202 within wireless network 200. In the example implementation of FIG. 3, node 202 is configured in accordance with General Packet Radio Service (GPRS) and Global Systems for Mobile (GSM) technologies. Node 202 includes a base station controller (BSC) 204 with an associated tower station 206, a Packet Control Unit (PCU) 208 added for GPRS support in GSM, a Mobile Switching Center (MSC) 210, a Home Location Register (HLR) 212, a Visitor Location Registry (VLR) 214, a Serving GPRS Support Node (SGSN) 216, a Gateway GPRS Support Node (GGSN) 218, and a Dynamic Host Configuration Protocol (DHCP) 220. This list of components is not meant to be an exhaustive list of the components of every node 202 within a GSM/GPRS network, but rather a list of components that are commonly used in communications through network 200.

In a GSM network, MSC 210 is coupled to BSC 204 and to a landline network, such as a Public Switched Telephone Network (PSTN) 222 to satisfy circuit switched requirements. The connection through PCU 208, SGSN 216 and GGSN 218 to the public or private network (Internet) 224 (also referred to herein generally as a shared network infrastructure) represents the data path for GPRS capable mobile devices. In a GSM network extended with GPRS capabilities, BSC 204 also contains a Packet Control Unit (PCU) 208 that connects to SGSN 216 to control segmentation, radio channel allocation and to satisfy packet switched requirements. To track mobile device location and availability for both circuit switched and packet switched management, HLR 212 is shared between MSC 210 and SGSN 216. Access to VLR 214 is controlled by MSC 210.

Station 206 is a fixed transceiver station. Station 206 and BSC 204 together form the fixed transceiver equipment. The fixed transceiver equipment provides wireless network coverage for a particular coverage area commonly referred to as a "cell". The fixed transceiver equipment transmits communication signals to and receives communication signals from mobile devices within its cell via station 206. The fixed transceiver equipment normally performs such functions as modulation and possibly encoding and/or encryption of signals to be transmitted to the mobile device in accordance with particular, usually predetermined, communication protocols and parameters, under control of its controller. The fixed transceiver equipment similarly demodulates and possibly decodes and decrypts, if necessary, any communication signals received from mobile device 100 within its cell. Communication protocols and parameters may vary between different nodes. For example, one node may employ a different modulation scheme and operate at different frequencies than other nodes.

For all mobile devices 100 registered with a specific network, permanent configuration data such as a user profile is stored in HLR 212. HLR 212 also contains location information for each registered mobile device and can be queried to determine the current location of a mobile device. MSC 210 is responsible for a group of location areas and stores the data of the mobile devices currently in its area of responsibility in VLR 214. Further VLR 214 also contains information on mobile devices that are visiting other networks. The information in VLR 214 includes part of the permanent mobile device data transmitted from HLR 212 to VLR 214 for faster access. By moving additional information from a remote HLR 212 node to VLR 214, the amount of traffic between these nodes can be reduced so that voice and data services can be provided with faster response times and at the same time requiring less use of computing resources.

SGSN 216 and GGSN 218 are elements added for GPRS support; namely packet switched data support, within GSM. SGSN 216 and MSC 210 have similar responsibilities within wireless network 200 by keeping track of the location of each mobile device 100. SGSN 216 also performs security functions and access control for data traffic on network 200. GGSN 218 provides internetworking connections with external packet switched networks and connects to one or more SGSN's 216 via an Internet Protocol (IP) backbone network operated within the network 200. During normal operations, a given mobile device 100 must perform a "GPRS Attach" to acquire an IP address and to access data services. This requirement is not present in circuit switched voice channels as Integrated Services Digital Network (ISDN) addresses are used for routing incoming and outgoing calls. Currently, all GPRS capable networks use private, dynamically assigned IP addresses, thus requiring a DHCP server 220 connected to the GGSN 218. There are many mechanisms for dynamic IP assignment, including using a combination of a Remote Authentication Dial-In User Service (RADIUS) server and DHCP server. Once the GPRS Attach is complete, a logical connection is established from a mobile device 100, through PCU 208, and SGSN 216 to an Access Point Node (APN) within GGSN 218. The APN represents a logical end of an IP tunnel that can either access direct Internet compatible services or private network connections. The APN also represents a security mechanism for network 200, insofar as each mobile device 100 must be assigned to one or more APNs and mobile devices 100 cannot exchange data without first performing a GPRS Attach to an APN that it has been authorized to use. The APN may be considered to be similar to an Internet domain name such as "myconnection.wireless.com".

Once the GPRS Attach is complete, a tunnel is created and all traffic is exchanged within standard IP packets using any protocol that can be supported in IP packets. This includes tunneling methods such as IP over IP as in the case with some IPSecurity (IPsec) connections used with Virtual Private Networks (VPN). These tunnels are also referred to as Packet Data Protocol (PDP) Contexts and there are a limited number of these available in the network 200. To maximize use of the PDP Contexts, network 200 will run an idle timer for each PDP Context to determine if there is a lack of activity. When a mobile device 100 is not using its PDP Context, the PDP Context can be deallocated and the IP address returned to the IP address pool managed by DHCP server 220.

Figure 4:
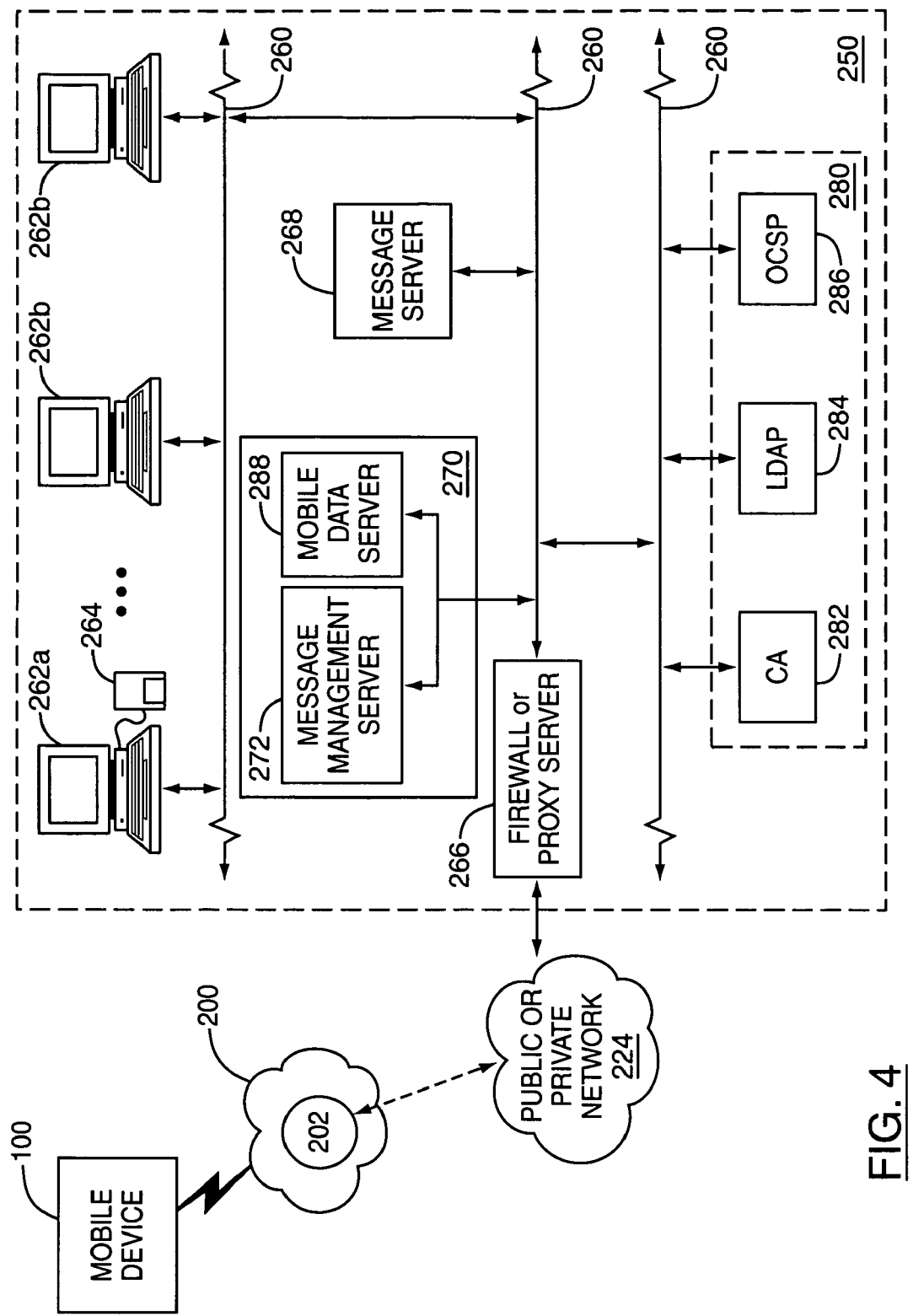
FIG. 4 is a block diagram illustrating components of a host system in one example configuration.

Referring now to FIG. 4, a block diagram illustrating components of a host system in one example configuration is shown. Host system 250 will typically be a corporate office or other local area network (LAN), but may instead be a home office computer or some other private system, for example, in variant implementations. In this example shown in FIG. 4, host system 250 is depicted as a LAN of an organization to which a user of mobile device 100 belongs.

LAN 250 comprises a number of network components connected to each other by LAN connections 260. For instance, a user's desktop computing device ("desktop computer") 262a with an accompanying cradle 264 for the user's mobile device 100 is situated on LAN 250. Cradle 264 for mobile device 100 may be coupled to computer 262a by a serial or a Universal Serial Bus (USB) connection, for example. Other user computers 262b are also situated on LAN 250, and each may or may not be equipped with an accompanying cradle 264 for a mobile device. Cradle 264 facilitates the loading of information (e.g. PIM data, private symmetric encryption keys to facilitate secure communications) between mobile device 100 and LAN 250) from user computer 262a to mobile device 100, and may be particularly useful for bulk information updates often performed in initializing mobile device 100 for use. The information downloaded to mobile device 100 may include certificates used in the exchange of messages. The process of downloading information from a user's desktop computer 262a to the user's mobile device 100 may also be referred to as synchronization.

It will be understood by persons skilled in the art that user computers 262a, 262b will typically be also connected to other peripheral devices not explicitly shown in FIG. 4. Furthermore, only a subset of network components of LAN 250 are shown in FIG. 4 for ease of exposition, and it will be understood by persons skilled in the art that LAN 250 will comprise additional components not explicitly shown in FIG. 4, for this example configuration. More generally, LAN 250 may represent a smaller part of a larger network [not shown] of the organization, and may comprise different components and/or be arranged in different topologies than that shown in the example of FIG. 4.

In this example, mobile device 100 communicates with LAN 250 through a node 202 of wireless network 200 and a shared network infrastructure 224 such as a service provider network or the public Internet. Access to LAN 250 may be provided through one or more routers [not shown], and computing devices of LAN 250 may operate from behind a firewall or proxy server 266.

In a variant implementation, LAN 250 comprises a wireless VPN router [not shown] to facilitate data exchange between the LAN 250 and mobile device 100. The concept of a wireless VPN router is new in the wireless industry and implies that a VPN connection can be established directly through a specific wireless network to mobile device 100. The possibility of using a wireless VPN router has only recently been available and could be used when the new Internet Protocol (IP) Version 6 (IPV6) arrives into IP-based wireless networks. This new protocol will provide enough IP addresses to dedicate an IP address to every mobile device, making it possible to push information to a mobile device at any time. An advantage of using a wireless VPN router is that it could be an off-the-shelf VPN component, not requiring a separate wireless gateway and separate wireless infrastructure to be used. A VPN connection would preferably be a Transmission Control Protocol (TCP)/IP or User Datagram Protocol (UDP)/IP connection to deliver the messages directly to mobile device 100 in this variant implementation.

Messages intended for a user of mobile device 100 are initially received by a message server 268 of LAN 250. Such messages may originate from any of a number of sources. For instance, a message may have been sent by a sender from a computer 262b within LAN 250, from a different mobile device [not shown] connected to wireless network 200 or to a different wireless network, or from a different computing device or other device capable of sending messages, via the shared network infrastructure 224, and possibly through an application service provider (ASP) or Internet service provider (ISP), for example.

Message server 268 typically acts as the primary interface for the exchange of messages, particularly e-mail messages, within the organization and over the shared network infrastructure 224. Each user in the organization that has been set up to send and receive messages is typically associated with a user account managed by message server 268. One example of a message server 268 is a Microsoft Exchange™ Server. In some implementations, LAN 250 may comprise multiple message servers 268. Message server 268 may also be adapted to provide additional functions beyond message management, including the management of data associated with calendars and task lists, for example.

When messages are received by message server 268, they are typically stored in a message store [not explicitly shown], from which messages can be subsequently retrieved and delivered to users. For instance, an e-mail client application operating on a user's computer 262a may request the e-mail messages associated with that user's account stored on message server 268. These messages would then typically be retrieved from message server 268 and stored locally on computer 262a.

When operating mobile device 100, the user may wish to have e-mail messages retrieved for delivery to the handheld. An e-mail client application operating on mobile device 100 may also request messages associated with the user's account from message server 268. The e-mail client may be configured (either by the user or by an administrator, possibly in accordance with an organization's information technology (IT) policy) to make this request at the direction of the user, at some pre-defined time interval, or upon the occurrence of some pre-defined event. In some implementations, mobile device 100 is assigned its own e-mail address, and messages addressed specifically to mobile device 100 are automatically redirected to mobile device 100 as they are received by message server 268.

To facilitate the wireless communication of messages and message-related data between mobile device 100 and components of LAN 250, a number of wireless communications support components 270 may be provided. In this example implementation, wireless communications support components 270 comprise a message management server 272, for example. Message management server 272 is used to specifically provide support for the management of messages, such as e-mail messages, that are to be handled by mobile devices. Generally, while messages are still stored on message server 268, message management server 272 can be used to control when, if, and how messages should be sent to mobile device 100. Message management server 272 also facilitates the handling of messages composed on mobile device 100, which are sent to message server 268 for subsequent delivery.

For example, message management server 272 may: monitor the user's "mailbox" (e.g. the message store associated with the user's account on message server 268) for new e-mail messages; apply user-definable filters to new messages to determine if and how the messages will be relayed to the user's mobile device 100; compress and encrypt new messages (e.g. using an encryption technique such as Data Encryption Standard (DES) or Triple DES) and push them to mobile device 100 via the shared network infrastructure 224 and wireless network 200; and receive messages composed on mobile device 100 (e.g. encrypted using Triple DES), decrypt and decompress the composed messages, re-format the composed messages if desired so that they will appear to have originated from the user's computer 262a, and re-route the composed messages to message server 268 for delivery.

Certain properties or restrictions associated with messages that are to be sent from and/or received by mobile device 100 can be defined (e.g. by an administrator in accordance with IT policy) and enforced by message management server 272. These may include whether mobile device 100 may receive encrypted and/or signed messages, minimum encryption key sizes, whether outgoing messages must be encrypted and/or signed, and whether copies of all secure messages sent from mobile device 100 are to be sent to a pre-defined copy address, for example.

Message management server 272 may also be adapted to provide other control functions, such as only pushing certain message information or pre-defined portions (e.g. "blocks") of a message stored on message server 268 to mobile device 100. For example, when a message is initially retrieved by mobile device 100 from message server 268, message management server 272 is adapted to push only the first part of a message to mobile device 100, with the part being of a pre-defined size (e.g. 2 KB). The user can then request more of the message, to be delivered in similar-sized blocks by message management server 272 to mobile device 100, possibly up to a maximum pre-defined message size.

Accordingly, message management server 272 facilitates better control over the type of data and the amount of data that is communicated to mobile device 100, and can help to minimize potential waste of bandwidth or other resources.

It will be understood by persons skilled in the art that message management server 272 need not be implemented on a separate physical server in LAN 250 or other network. For example, some or all of the functions associated with message management server 272 may be integrated with message server 268, or some other server in LAN 250. Furthermore, LAN 250 may comprise multiple message management servers 272, particularly in variant implementations where a large number of mobile devices need to be supported.

In the exemplary embodiments of the systems described herein, certificates are used in the processing of encoded messages, such as e-mail messages, that are encrypted and/or signed. While Simple Mail Transfer Protocol (SMTP), RFC822 headers, and Multipurpose Internet Mail Extensions (MIME) body parts may be used to define the format of a typical e-mail message not requiring encoding, Secure/MIME (S/MIME), a version of the MIME protocol, may be used in the communication of encoded messages (i.e. in secure messaging applications). S/MIME enables end-to-end authentication and confidentiality, and provides data integrity and privacy from the time an originator of a message sends a message until it is decoded and read by the message recipient. Other known standards and protocols may be employed to facilitate secure message communication, such as Pretty Good Privacy™ (PGP), and variants of PGP such as OpenPGP for example, and others known in the art.

Secure messaging protocols such as S/MIME rely on public and private encryption keys to provide confidentiality and integrity, and on a Public Key Infrastructure (PKI) to communicate information that provides authentication and authorization. Data encrypted using a private key of a private key/public key pair can only be decrypted using the corresponding public key of the pair, and vice-versa. It is intended that private key information never be made public, whereas public key information is to be shared.

For example, if a sender wishes to send a message to a recipient in encrypted form, the recipient's public key is used to encrypt a message, which can then be decrypted only using the recipient's private key. Alternatively, in some encoding techniques, a one-time session key is generated and used to encrypt the body of a message, typically with a symmetric encryption technique (e.g. Triple DES). The session key is then encrypted using the recipient's public key (e.g. with a public key encryption algorithm such as RSA), which can then be decrypted only using the recipient's private key. The decrypted session key can then be used to decrypt the message body. The message header may be used to specify the particular encryption scheme that must be used to decrypt the message. Other encryption techniques based on public key cryptography may be used in variant implementations. However, in each of these cases, only the recipient's private key may be used to facilitate successful decryption of the message, and in this way, the confidentiality of messages can be maintained.

As a further example, a sender may sign a message using a digital signature. A digital signature is a digest of the message (e.g. a hash of the message) encoded using the sender's private key, which can then be appended to the outgoing message. To verify the digital signature of the message when received, the recipient uses the same technique as the sender (e.g. using the same standard hash algorithm) to obtain a digest of the received message. The recipient also uses the sender's public key to decode the digital signature, in order to obtain what should be a matching digest for the received message. If the digests of the received message do not match, this suggests that either the message content was changed during transport and/or the message did not originate from the sender whose public key was used for verification. Digital signature algorithms are designed in such a way that only someone with knowledge of the sender's private key should be able to encode a signature that the recipient will decode correctly using the sender's public key. Therefore, by verifying a digital signature in this way, authentication of the sender and message integrity can be maintained.

An encoded message may be encrypted, signed, or both encrypted and signed. With respect to certain secure messaging protocols such as S/MIME, the authenticity of public keys used in these operations is validated using certificates. A certificate is a digital document issued by a certificate authority (CA). Certificates are used to authenticate the association between users and their public keys, and essentially, provides a level of trust in the authenticity of the users' public keys. Certificates contain information about the certificate holder, with certificate contents typically formatted in accordance with an accepted standard (e.g. X.509). The certificates are typically digitally signed by the certificate authority.

In PGP-based systems, a PGP key is used, which is like an S/MIME certificate in that it contains public information including a public key and information on the key holder or owner. Unlike S/MIME certificates, however, PGP keys are not generally issued by a certificate authority, and the level of trust in the authenticity of a PGP key typically requires verifying that a trusted individual has vouched for the authenticity of a given PGP key.

For the purposes of the specification and in the claims, the term "certificate" is used generally to describe a construct used to provide public keys for encoding and decoding messages and information on the key holder, and may be deemed to include what is generally known as a "PGP key" and other similar constructs.

Figure 5:
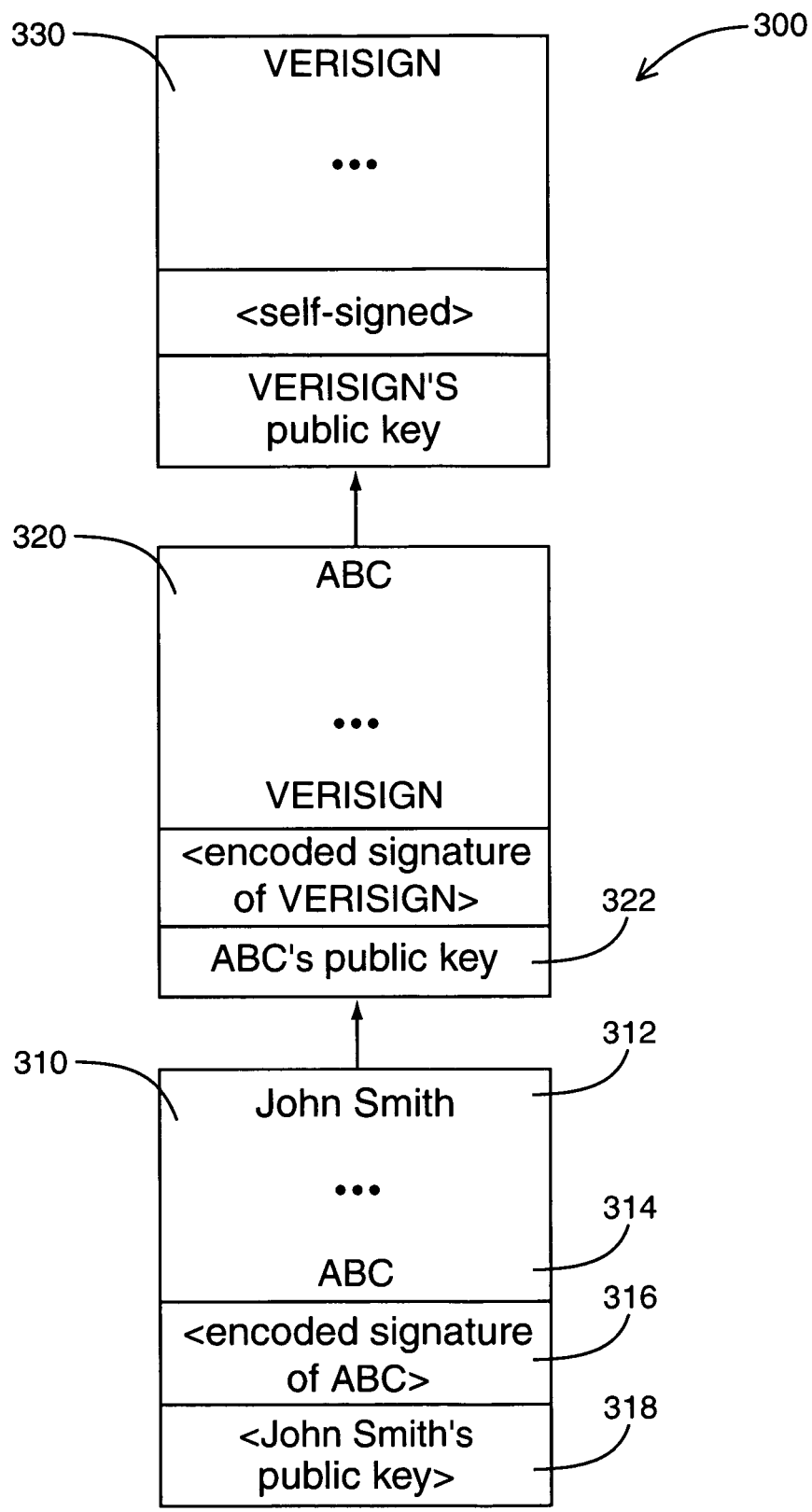
FIG. 5 is a block diagram showing an example of a certificate chain.

Consider FIG. 5, in which an example certificate chain 300 is shown. Certificate 310 issued to "John Smith" is an example of a certificate issued to an individual, which may be referred to as an end entity certificate. End entity certificate 310 typically identifies the certificate holder 312 (i.e. John Smith in this example) and the issuer of the certificate 314, and includes a digital signature of the issuer 316 and the certificate holder's public key 318. Certificate 310 will also typically include other information and attributes that identify the certificate holder (e.g. e-mail address, organization name, organizational unit name, location, etc.). When the individual composes a message to be sent to a recipient, it is customary to include that individual's certificate 310 with the message.

For a public key to be trusted, its issuing organization must be trusted. The relationship between a trusted CA and a user's public key can be represented by a series of related certificates, also referred to as a certificate chain. The certificate chain can be followed to determine the validity of a certificate.

For instance, in the example certificate chain 300 shown in FIG. 5, the recipient of a message purported to be sent by John Smith may wish to verify the trust status of certificate 310 attached to the received message. To verify the trust status of certificate 310 on a recipient's computing device (e.g. computer 262a of FIG. 4) for example, the certificate 320 of issuer ABC is obtained, and used to verify that certificate 310 was indeed signed by issuer ABC. Certificate 320 may already be stored in a certificate store on the computing device, or it may need to be retrieved from a certificate store or source (e.g. LDAP server 284 of FIG. 4 or some other public or private LDAP server). If certificate 320 is already stored in the recipient's computing device and the certificate has been designated as trusted by the recipient, then certificate 310 is considered to be trusted since it chains to a stored, trusted certificate.

However, in the example shown in FIG. 5, certificate 330 is also required to verify the trust status of certificate 310. Certificate 330 is self-signed, and is referred to as a "root certificate". Accordingly, certificate 320 may be referred to as an "intermediate certificate" in certificate chain 300; any given certificate chain to a root certificate, assuming a chain to the root certificate can be determined for a particular end entity certificate, may contain zero, one, or multiple intermediate certificates. If certificate 330 is a root certificate issued by a trusted source (from a large certificate authority such as Verisign or Entrust, for example), then certificate 310 may be considered to be trusted since it chains to a trusted certificate. The implication is that both the sender and the recipient of the message trust the source of the root certificate 330. If a certificate cannot be chained to a trusted certificate, the certificate may be considered to be "not trusted".

Certificate servers store information about certificates and lists identifying certificates that have been revoked. These certificate servers can be accessed to obtain certificates and to verify certificate authenticity and revocation status. For example, a Lightweight Directory Access Protocol (LDAP) server may be used to obtain certificates, and an Online Certificate Status Protocol (OCSP) server may be used to verify certificate revocation status.

Standard e-mail security protocols typically facilitate secure message transmission between non-mobile computing devices (e.g. computers 262a, 262b of FIG. 4; remote desktop devices). Referring again to FIG. 4, in order that signed messages received from senders may be read from mobile device 100 and that encrypted messages be sent (e,g. to those senders), mobile device 100 is adapted to store certificates and associated public keys of other individuals. Certificates stored on a user's computer 262a will typically be downloaded from computer 262a to mobile device 100 through cradle 264, for example.

Certificates stored on computer 262a and downloaded to mobile device 100 are not limited to certificates associated with individuals but may also include certificates issued to CAs, for example. Certain certificates stored in computer 262a and/or mobile device 100 can also be explicitly designated as "trusted" by the user. Accordingly, when a certificate is received by a user on mobile device 100, it can be verified on mobile device 100 by matching the certificate with one stored on mobile device 100 and designated as trusted, or otherwise determined to be chained to a trusted certificate.

Mobile device 100 may also be adapted to store the private key of the public key/private key pair associated with the user, so that the user of mobile device 100 can sign outgoing messages composed on mobile device 100, and decrypt messages sent to the user encrypted with the user's public key. The private key may be downloaded to mobile device 100 from the user's computer 262a through cradle 264, for example. The private key is preferably exchanged between the computer 262a and mobile device 100 so that the user may share one identity and one method for accessing messages.

User computers 262a, 262b can obtain certificates from a number of sources, for storage on computers 262a, 262b and/or mobile devices (e.g. mobile device 100). These certificate sources may be private (e.g. dedicated for use within an organization) or public, may reside locally or remotely, and may be accessible from within an organization's private network or through the Internet, for example. In the example shown in FIG. 4, multiple PKI servers 280 associated with the organization reside on LAN 250. PKI servers 280 include a CA server 282 for issuing certificates, an LDAP server 284 used to search for and download certificates (e.g. for individuals within the organization), and an OCSP server 286 used to verify the revocation status of certificates.

Certificates may be retrieved from LDAP server 284 by a user computer 262a, for example, to be downloaded to mobile device 100 via cradle 264. However, in a variant implementation, LDAP server 284 may be accessed directly (i.e. "over the air" in this context) by mobile device 100, and mobile device 100 may search for and retrieve individual certificates through a mobile data server 288. Similarly, mobile data server 288 may be adapted to allow mobile device 100 to directly query OCSP server 286 to verify the revocation status of certificates.

In variant implementations, only selected PKI servers 280 may be made accessible to mobile devices (e.g. allowing certificates to be downloaded only from a user's computer 262a, 262b, while allowing the revocation status of certificates to be checked from mobile device 100).

In variant implementations, certain PKI servers 280 may be made accessible only to mobile devices registered to particular users, as specified by an IT administrator, possibly in accordance with an IT policy, for example.

Other sources of certificates not shown may include a Windows certificate store, another secure certificate store on or outside LAN 250, and smart cards, for example.

Figure 6:
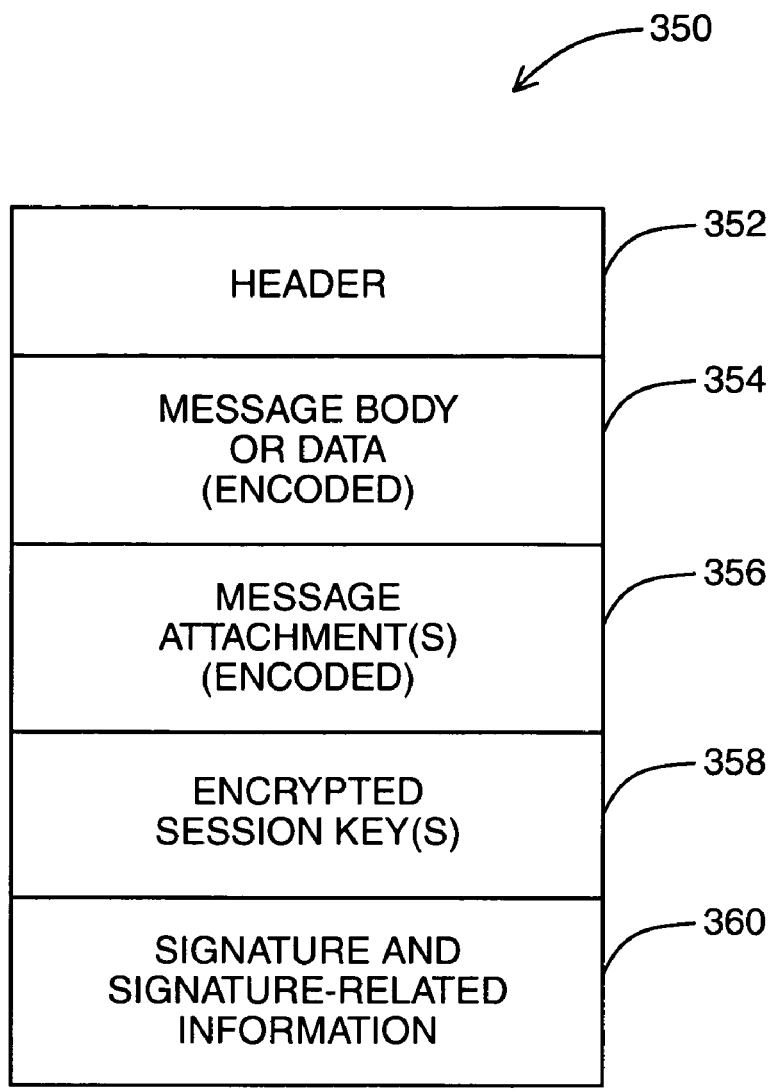
FIG. 6 is a block diagram illustrating components of an example of an encoded message.

Referring now to FIG. 6, a block diagram illustrating components of an example of an encoded message, as may be received by a message server (e.g. message server 268 of FIG. 4), is shown generally as 350. Encoded message 350 typically includes one or more of the following: a header portion 352, an encoded body portion 354, optionally one or more encoded attachments 356, one or more encrypted session keys 358, and signature and signature-related information 360. For example, header portion 352 typically includes addressing information such as "To", "From", and "CC" message addresses, and may also include message length indicators, and sender encryption and signature scheme identifiers, for example. Actual message content normally includes a message body or data portion 354 and possibly one or more attachments 356, which may be encrypted by the sender using a session key. If a session key was used, it is typically encrypted for each intended recipient using the respective public key for each recipient, and included in the message at 358. If the message was signed, a signature and signature-related information 360 are also included. This may include the sender's certificate, for example.

The format for an encoded message as shown in FIG. 6 is provided by way of example only, and persons skilled in the art will understand that encoded messages may exist in other formats. Depending on the specific messaging scheme used, components of an encoded message may appear in a different order than shown in FIG. 6, and an encoded message may include fewer, additional, or different components, which may depend on whether the encoded message is encrypted, signed or both. For example, the encrypted session keys 358 may appear before the message body or data portion 354 and message attachments 356.

Embodiments of systems and methods are described herein where message addresses (e.g. e-mail addresses) are associated with certificates. More specifically, these embodiments may be employed to facilitate the association of one or more secondary message addresses with each of one or more certificates selected by the user of a computing device (e.g. a mobile device).

When a user wishes to send an encrypted message (e.g. an e-mail message) to an individual, the certificate of that individual to whom the message is to be sent is generally required. An e-mail application or other messaging application must determine, in some manner, whether the requisite certificate is available (e.g. in a local certificate store).

In the event that there are multiple certificates stored locally, the application must determine which of those certificates is to be employed to encrypt the message. Since most certificates will typically contain the e-mail address of the owner of the certificate, known e-mail applications will typically determine the requisite certificate by matching the e-mail address data on the certificate itself with the e-mail address to which the message is to be sent. An e-mail address to which the message is to be sent is typically identified in the header portion of the e-mail message (e.g. header portion 352 of FIG. 6).

In some instances, an e-mail application may not be able to locate a certificate for the individual to whom the message is to be sent, despite efforts to locate a certificate that contains the e-mail address of the individual from available certificates in a search. If a search is performed and no certificates with a matching e-mail address are located, the application may prompt the user for direction. The user may choose to send the message without encryption, to cancel the sending of the message, or to identify a particular certificate that should be used for the encryption.

However, with respect to some known e-mail applications, if a particular certificate to be used for the encryption has been specified (e.g. by a user or the application) and an attempt is made to employ that particular certificate to encrypt a message that the user intends to send to an individual, but that certificate contains an e-mail address that does not match the e-mail address to which the message is to be sent, an error message indicating an address mismatch would normally be returned to the user. Depending on the configuration settings of the application, the message might be neither encrypted nor sent if an address mismatch is detected.

Also, in some instances, an attempt may be made to employ a certificate that may not contain any e-mail addresses at all within the certificate. In those situations, the known e-mail applications would normally also return an error message to the user indicating an address mismatch, and would neither encrypt nor send the message.

However, in certain situations, it may be desirable to permit a message to be encrypted using a certificate that does not contain an e-mail address that matches the e-mail address of the individual to which the message is to be sent.

For example, some certificates may not contain any e-mail addresses within the certificate at all, but may otherwise be valid and capable of being used to encrypt messages. This situation might arise where the certificates were originally issued at a time when no e-mail address data to be associated with the certificate holder was provided, or where such data was not required in order that the certificate be issued by the issuer, for example. If subsequently, the certificate holder wishes to add new e-mail address data to the certificate, this cannot be properly done by simply modifying the data in the certificate, as the digital signature of the certificate issuer (e.g. 316 of FIG. 5) will not verify successfully when the certificate is validated. Issuance of a new certificate that would contain the new e-mail address or addresses would typically be required.

As a further example, if an e-mail address of a certificate holder is contained within his or her certificate, but that e-mail address has changed since the certificate was issued, the e-mail address data in the certificate cannot simply be modified to reflect the change. Similarly, if the individual wishes to use the same certificate for messages received at multiple e-mail addresses, additional e-mail addresses cannot simply be appended to the e-mail address data in the original certificate for the reasons explained above. Issuance of a new certificate to incorporate the changed or added e-mail address data would typically be required.

Accordingly, embodiments of the systems and methods described herein allow additional message addresses to be associated with an existing certificate, so that the certificate can be used by a messaging application to encrypt messages even if a message address to which the message is to be sent does not match a message address contained within the certificate. A new certificate incorporating the additional message addresses need not be issued.

In one broad aspect, the additional message addresses are saved in a data structure that resides in a secure data store on the computing device. When a message is to be encrypted and sent to an individual using a particular certificate, the certificate can be properly located by the messaging application based on the address to which the message is to be sent and an address mismatch would not be detected by the messaging application so long as the address to which the message is to be sent matches any of the message addresses associated with the certificate. The message addresses considered by the messaging application to be associated with the certificate include any message addresses contained within the certificate as issued (also referred to herein in the specification and claims as "primary message addresses"), as well as any additional message addresses subsequently saved in the data structure and associated with the certificate (also referred to herein in the specification and claims as "secondary message addresses").

In one embodiment, the secure data store is a key store or certificate store on the computing device. The data structure containing secondary message addresses associated with a certificate is stored in the key store along with the certificate.

The data structure is linked with or can otherwise contain a reference to the certificate, so that the certificate with which the secondary message addresses are associated can be identified. Alternatively, in another embodiment, the secondary message addresses and the associated certificate can be saved together in the data structure, which resides in the secure data store.

In the above cases, once the secondary message addresses and the associated certificate are stored in the secure data store on the computing device, the secondary message addresses associated with a certificate may be considered to be an integral part of the certificate itself.

The secure data store prevents unauthorized access to the data stored therein, by malicious software applications, for example. In one embodiment, the secure data store is a data store for which authorization of the user is required to perform pre-specified operations on the data stored therein. For example, the secure data store may be password-protected, such that the user of the computing device must input the correct password(s) before operations such as (i) saving new secondary message addresses in the data structure, (ii) modifying the secondary message addresses in the data structure, and/or (iii) deleting secondary message addresses saved in the data structure, may be performed. Depending on the specific implementation, certain operations, such as viewing the secondary message addresses currently saved in a data structure for example, may not require the user to first input the correct password(s) in order to be performed.

Some known systems allow users to bind certificates with a specific contact record associated with an individual. When a message is to be encrypted and sent to that individual, such known systems, however, will still typically require that the bound certificate contain an e-mail address that matches the e-mail address to which the message is to be sent. Furthermore, in contrast to the embodiments described herein where message addresses are associated with certificates and not vice-versa, the known systems may be relatively less secure since contact records are not typically protected against unauthorized modification to the same extent that certificate data is protected.

The protection provided by the embodiments of the systems and methods described herein ensures that a malicious application cannot make changes to the list of secondary message addresses associated with a certificate without the consent of the user of the computing device.

Embodiments of the systems and methods described herein also permit users of the computing device to select specific certificates, and associate user-specified addresses with them. This may make the process of sending messages more efficient from the user's perspective, which can be particularly advantageous when the user is operating a computing device such as a mobile device. For example, once the user becomes aware that the e-mail address of a particular certificate's holder has changed, he can simply add the new e-mail address to the list of secondary message addresses associated with the certificate holder's original certificate. An e-mail or other messaging application on the computing device can then employ the original certificate for encrypting messages that are to be sent to the certificate holder at the new e-mail address.

If an attempt is made to use a particular certificate to encrypt a message to be sent to the certificate holder at the new e-mail address, but the new e-mail address is not contained in or associated with that certificate, an address mismatch would be detected. Some known systems may be adapted to prompt the user to manually search through a list of certificates in a certificate store for a different certificate that might contain the new e-mail address, every time the address to which a message is to be sent does not match an address contained in the certificate. This process may be tedious and time-consuming, particularly on a computing device such as a mobile device. By allowing a secondary message address to be associated with a certificate, an address mismatch would not be detected where it is acceptable to use that certificate to encrypt a message, even if that secondary message address is not actually contained within the certificate. Accordingly, the need to perform a manual search for a different certificate, which would otherwise be performed in response to the detection of an address mismatch, can be avoided in those cases.

These and other features of various embodiments will now be described in greater detail with reference to FIG. 7.

Figure 7:
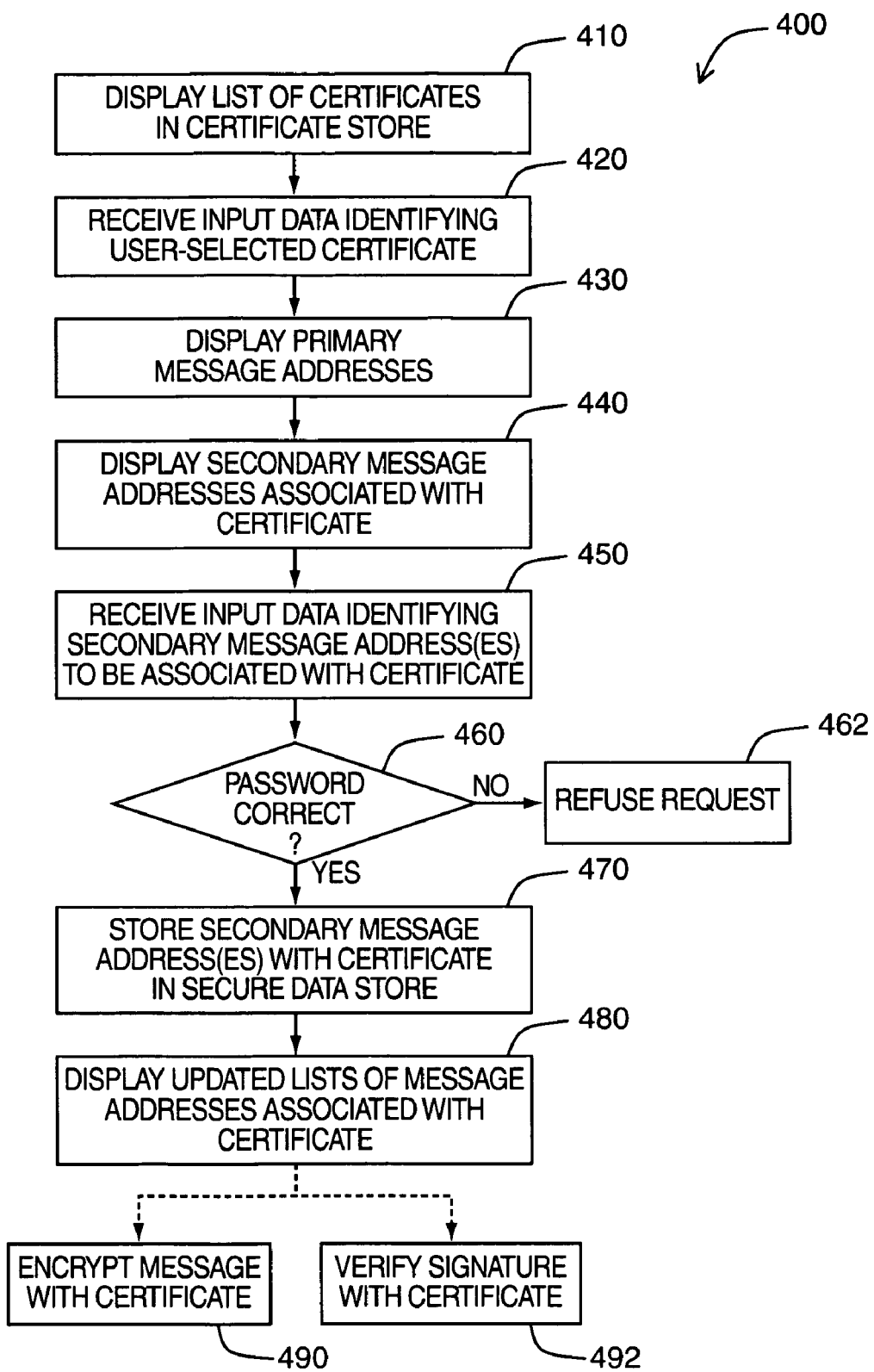
FIG. 7 is a flowchart illustrating steps in a method of associating message addresses with certificates in accordance with at least one embodiment.

Referring to FIG. 7, a flowchart illustrating steps in a method of associating message addresses with certificates in one embodiment is shown generally as 400. Further details with respect to various steps of method 400 have been discussed above, in this specification.

In method 400, by way of example, the steps described may be performed by a key store browser application that executes and resides on a computing device. The key store browser application is an application programmed to display all certificates stored in a key store or certificate store on the computing device. However, in variant embodiments, a PIM, messaging application, or other application may be programmed to perform the steps of the method. The method may also be implemented in multiple co-operating applications executing and residing on the computing device.

The computing device upon which an application performing the steps of an embodiment of a method described herein executes and resides may be, for example, a mobile device.

At step 410, a list of certificates currently in a key store on the computing device (e.g. mobile device 100 of FIG. 1) is displayed to the user. The key store may be a central key store, or may be one of multiple key stores on the computing device as selected by the user, or as identified as a default key store based on the configuration of the key store browser application.

At step 420, input data is received from the user that identifies a specific certificate, as selected by the user from the list displayed at step 410, with which at least one or more secondary message addresses (e.g. e-mail addresses) is to be associated. An "associate addresses" menu option may be selectable by the user to facilitate the performance of this step.

A certificate typically contains one e-mail address within the certificate itself, and in some cases more than one e-mail address. These e-mail addresses contained within the certificate are referred to herein as primary message addresses. Some certificates may not contain any e-mail addresses, and in that case, the certificate will not have any primary message addresses associated therewith.

A secondary message address may be considered to be any message address that is to be associated with a certificate after the certificate is issued. In this embodiment, the key store browser application is programmed to permit a message address to be associated with a certificate as a secondary message address only if the message address is not already a primary message address, in order to prevent unnecessary duplication. However, in variant systems, a message address may be permitted to be associated with a certificate as a secondary message address even if the message address is already contained in the certificate.

At step 430, optionally, a list of the primary message addresses associated with the certificate selected at step 420 (e.g. the e-mail addresses contained in the selected certificate) is displayed to the user. It will be understood that these primary message addresses generally cannot be modified in any way without invalidating the signature of the issuer on the certificate (e.g. 316 of FIG. 5).

At step 440, optionally, a list of the secondary message addresses currently associated with the certificate selected at step 420 is displayed to the user. The list of secondary message addresses will initially be empty when the certificate is first imported onto the handheld. The user can add message addresses to this list, as described below. The user can also subsequently edit and/or delete message addresses from the list [not explicitly shown].

At step 450, input data is received from the user that identifies one or more new secondary message addresses to be associated with the certificate selected at step 420. For example, an input window having one or more fields in which the user can manually enter additional message addresses to be associated with the certificate can be provided to receive the input data. Alternatively, a list of selectable message addresses can be displayed, from which the user may select message addresses to be associated with the certificate. The list may be composed from message addresses contained in contact records, or derived from messages in the user's "inbox" or other message folder, for example.

At step 460, the application prompts for a password from the user, required to associate new message addresses with the user-selected certificate. If the correct password is not received from the user, the request to associate the new message address(es) with the user-selected certificate is denied at step 462.

Otherwise, at step 470, the secondary message address(es) identified by the input data received at step 450 is stored in a data structure such that the user-selected certificate with which the secondary message addresses are to be associated can be identified.

For example, the user-selected certificate and the secondary message addresses associated therewith may be saved together in a data object. A separate list of primary message addresses associated with a certificate, composed of message address data extracted from the certificate, may also be created and stored [steps not shown] with user-selected certificate in the data object, if desired. As a further example, the secondary message addresses may be saved as a list or in a table or array, which can include a pointer or reference to the associated user-selected certificate. In some cases, the secondary message addresses for one associated certificate can be saved together with the secondary message addresses for other associated certificates in a common data structure, provided that an application is able to determine which specific secondary message addresses have been associated with which specific certificates. It will be understood by persons skilled in the art that other variant configurations are possible.

In one embodiment, both the secondary message addresses and the associated user-selected certificate are saved in the same key store, which is a secure data store. Data in the key store is protected from unauthorized modification. The key store is typically reserved for storing only certificates, but in accordance with this embodiment, now also stores the secondary message addresses. For example, the key store data may be protected by a user password, such that authorization of the user must be received (through the user providing the correct password) before new secondary message addresses can be added (at e.g. step 460), and/or before other pre-defined operations (e.g. modifying and/or deleting secondary message addresses previously saved in the key store) can be performed. As noted earlier, this protection ensures that a malicious application cannot make changes to the secondary message addresses associated with a given certificate without the user's consent.

It will be understood that the secondary message addresses and the associated user-selected certificate may be stored in separate physical components that collectively comprise a secure data store.

At step 480, optionally, a list of primary message addresses and an updated list of secondary message addresses associated with the certificate selected at step 420 is displayed to the user. By way of illustration only, a dialog box illustrating a list of primary and secondary message addresses associated with a certificate is shown in FIG. 8, in one exemplary implementation.

In the example dialog box of FIG. 8, johndoe@companyabc.com is the primary message address associated with a particular certificate. Messages sent to or from the message address johndoe@companyabc.net may also be respectively redirected to or originate from the same user. However, the message address johndoe@companyabc.net may not be identified in the particular certificate. In this embodiment, this address is accordingly associated with the certificate as a secondary message address, so that messages being sent to the secondary message address can be encoded using the same certificate, and messages received from the secondary message address can be decoded using the same certificate.

Subsequently, at step 490, an e-mail or other messaging application is employed by a user to send an encrypted message to an individual. This application can search the secure data store for a matching e-mail address, as either a primary message address or a secondary message address that has been associated with a certificate. If a match is found, this application can then use the located certificate to encrypt the outgoing message.

Optionally, as shown at step 492, an e-mail or other messaging application may also attempt to verify the digital signature on a message received from an individual. This application can search the secure data store for a matching e-mail address, as either a primary message address or a secondary message address that has been associated with a certificate. If a match is found, this application can then use the located certificate to verify the signature on the received message. However, in other systems, different criteria would be used to locate the correct certificate to verify the digital signature on a received message, such as the serial number and issuer of the signing certificate, typically provided with the signature information in the received message. A check for an address mismatch may be performed after the signature is verified as an additional safety measure, in order to indicate to the user whether the message appears to have been signed with a certificate belonging to the sender of the received message based on the sender's address provided with the received message.

In the embodiments described above, steps of method 400 are performed at the computing device. However, in a variant embodiment, steps of method 400 are performed at a mobile device, and in another variant embodiment, at least some of the steps may be performed at a desktop computer. The desktop computer can then be synchronized with the computing device or mobile device, such that the secondary message addresses and the associated certificate are ultimately saved in the secure data store. An example of this variant embodiment is described with reference to FIG. 9.

Figure 9:
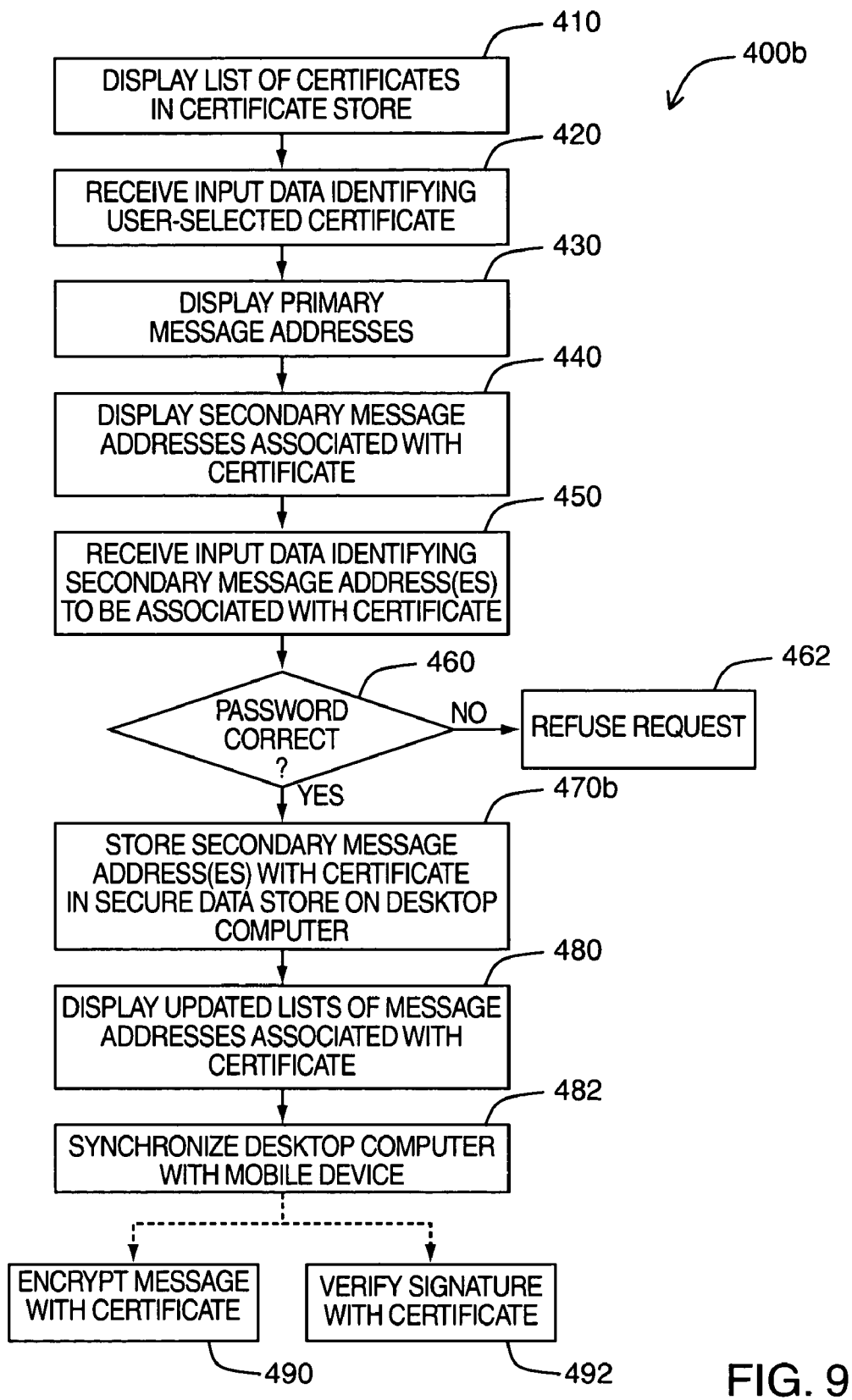
FIG. 9 is a flowchart illustrating steps in a method of associating message addresses with certificates in accordance with at least one other embodiment.

Referring to FIG. 9, a flowchart illustrating steps in a method of associating message addresses with certificates in another embodiment is shown generally as 400*b*.

Method 400*b* is similar to method 400, except that steps 410 to 480 are performed at a desktop computing device, with the exception of step 470. The desktop computing device may be a laptop device or other computing device with which the mobile device can be synchronized, depending on the particular system implementation. As shown as step 470*b*, the secondary message addresses are stored with the associated certificate in a secure data store (e.g. a key store) on the desktop computing device. The desktop computing device can then subsequently be synchronized with the mobile device (e.g. via cradle 264 of FIG. 4) at step 482, such that the secondary message addresses and certificate data in the secure data store on the desktop computing device are copied or moved to a secure data store on the mobile device. Steps 490 and 492 may also be performed in method 400*b*.

In a variant embodiment, an application on the mobile device or on a desktop computing device may be adapted to automatically associate a secondary message address with a certificate, when a new certificate is downloaded from an LDAP server (e.g. LDAP server 284 of FIG. 4), and in the event that the e-mail address attribute of the LDAP entry returned by the LDAP server differs from the e-mail address(es) contained in the downloaded certificate. In this case, the e-mail address of the LDAP entry, which differs from the e-mail address(es) contained in the certificate, is extracted from the entry and associated with the certificate as a secondary message address.

In the above description and in the claims, it is intended that the term "list" be interpreted broadly. For example, where information is described as being displayed in a "list", the "list" shall not be limited to a particular format of data representation. In particular, the information need not be displayed as a column of entries, but may alternatively be represented in other display formats.

The steps of the methods described herein may be provided as executable software instructions stored on computer-readable media, which may include transmission-type media and storage media.

The invention has been described with regard to a number of embodiments. However, it will be understood by persons skilled in the art that other variants and modifications may be made without departing from the scope of the invention as defined in the claims appended hereto.

The invention claimed is:

1. A method of associating message addresses with digital certificates, the method comprising the steps of:
   receiving, by a device, first input data identifying a user-selected certificate, wherein the user-selected certificate is a digital certificate, and wherein the user-selected certificate contains one or more primary message addresses associated therewith;
   receiving, by the device, second input data identifying one or more secondary message addresses to be associated with the user-selected certificate, wherein the one or more secondary message addresses are not identified in the user-selected certificate; and
   associating, by the device, the one or more secondary message addresses with the user-selected certificate, by saving the one or more secondary message addresses in a data structure residing in a secure data store on a local computing device such that the user-selected certificate with which the one or more secondary message addresses are associated is identifiable.

2. The method of claim 1, further comprising storing the user-selected certificate in the secure data store on the local computing device.

3. The method of claim 2, wherein the user-selected certificate is stored in the data structure.

4. The method of claim 1, further comprising the step of encrypting a message with the user-selected certificate, wherein the message address to which the message is to be sent matches any one of the primary or secondary message addresses associated with the user-selected certificate.

5. The method of claim 1, further comprising the step of verifying the digital signature on a message received from a sender with the user-selected certificate, wherein the message address of the sender from which the message is received matches any one of the primary or secondary message addresses associated with the user-selected certificate.

6. The method of claim 1, wherein the secure data store is a data store for which authorization user is required to be received before at least one of the operations selected from the following group is performed:
   i) saving one or more new secondary message addresses in the data structure;
   ii) modifying one or more secondary message addresses saved in the data structure; and
   iii) deleting one or more secondary message addresses saved in the data structure.

7. The method of claim 6, wherein the secure data store is protected by at least one user password, such that authorization is received when the at least one password is correctly input.

8. The method of claim 6, further comprising the step of displaying a list of secondary message addresses saved in the data structure.

9. The method of claim 1, further comprising the step of displaying a list of certificates from which the user-selected certificate is identified prior to the step of receiving first input data.

10. The method of claim 1, further comprising the step of displaying a list of message addresses from which the one or more secondary message addresses are identified prior to the step of receiving second input data.

11. The method of claim 1, wherein all of the steps of the method are performed at a mobile device.

12. The method of claim 1, wherein the local computing device comprises a mobile device.

13. The method of claim 12, wherein at least some of the steps of the method are performed at a desktop computer, and wherein the method further comprises the step of synchronizing the desktop computer with the mobile device so that the one or more secondary message addresses is saved in the data structure residing in the secure data store on the mobile device.

14. The method of claim 1, wherein the second input data is provided as user input.

15. The method of claim 1, wherein the second input data is extracted from an LDAP record.

16. A computer-readable storage medium upon which a plurality of computer-executable instructions are stored, the instructions, when executed, cause a processor to perform a method of associating message addresses with digital certificates, the method comprising:
   receiving first input data identifying a user-selected certificate, wherein the user-selected certificate is a digital certificate, and wherein the user-selected certificate contains one or more primary message addresses associated therewith;
   receiving second input data identifying one or more secondary message addresses to be associated with the user-selected certificate, wherein the one or more secondary message addresses are not identified in the user-selected certificate; and
   associating the one or more secondary message addresses with the user-selected certificate, by saving the one or more secondary message addresses in a data structure residing in a secure data store on a local computing device such that the user-selected certificate with which the one or more secondary message addresses are associated is identifiable.

17. A computing device comprising a processor configured to perform a method of associating message addresses with digital certificates, the method comprising the steps of:
   receiving first input data identifying a user-selected certificate, wherein the user-selected certificate is a digital certificate, and wherein the user-selected certificate contains one or more primary message addresses associated therewith;
   receiving second input data identifying one or more secondary message addresses to be associated with the user-selected certificate, wherein the one or more secondary message addresses are not identified in the user-selected certificate; and
   associating the one or more secondary message addresses with the user-selected certificate, by saving the one or more secondary message addresses in a data structure residing in a secure data store on a local computing device such that the user-selected certificate with which the one or more secondary message addresses are associated is identifiable.

18. A system for associating message addresses with digital certificates identified at a mobile device, and wherein the system comprises a desktop computer and the mobile device connectable thereto, and wherein the desktop computer comprises a processor configured to:
   receive first input data in a user-selected certificate, wherein the user-selected certificate is a digital certificate, and wherein the user-selected certificate contains one or more primary message addresses associated therewith;
   receive second input data identifying one or more secondary message addresses to be associated with the user-selected certificate, wherein the one or more secondary message addresses are not identified in the user-selected certificate;
   associate the one or more secondary message addresses with the user-selected certificate, by saving the one or more secondary message addresses in a first data structure such that the user-selected certificate with which the one or more secondary message addresses are associated is identifiable; and
   synchronize with the mobile device so that the one or more secondary message addresses identified by the second input data is copied from the first data structure and saved in a second data structure residing in a secure data store on the mobile device.

19. The system of claim 18, wherein a processor on the mobile device is configured to store the user-selected certificate in the secure data store on the mobile device.

20. The system of claim 19, wherein the processor on the mobile device is further configured to store the user-selected certificate in the second data structure.

21. The system of claim 18, wherein the processor is further configured to copy the user-selected certificate from the desktop computer so that the user-selected certificate is savable to the secure data store on the mobile device in synchronizing with the mobile device.

* * * * *